Dec. 13, 1955    R. F. KRUPP ET AL    2,726,851
AGITATING HEATER

Filed Jan. 21, 1953    2 Sheets-Sheet 1

INVENTORS
ROBERT F. KRUPP
MARVIN H. WARDELL
BY
Townsend and Townsend
ATTORNEYS

Dec. 13, 1955  R. F. KRUPP ET AL  2,726,851
AGITATING HEATER

Filed Jan. 21, 1953  2 Sheets-Sheet 2

INVENTORS
ROBERT F. KRUPP
MARVIN H. WARDELL
BY
Townsend and Townsend
ATTORNEYS

United States Patent Office 2,726,851
Patented Dec. 13, 1955

2,726,851

AGITATING HEATER

Robert F. Krupp, San Lorenzo, and Marvin Hal Wardell, Castro Valley, Calif., assignors to Gerber Products Company, Fremont, Mich., a corporation of Michigan Application January 21, 1953, Serial No. 332,476

5 Claims. (Cl. 259—9)

This invention relates to new and useful improvements in agitating heaters. More specifically, the invention is in the nature of an improvement in heaters of the type disclosed in Patent No. 2,492,635, issued December 27, 1949.

The agitating heater which is illustrated and described in the said patent employs a short, cylindrical mixing chamber of small volume into which a product to be heated is introduced and into which a heating medium such as steam is separately introduced. Within the chamber is a rapidly revolving blade which mixes the steam and product together with violent agitation. The steam is condensed and its heat is transferred to the product thereby rapidly raising the temperature of the product.

In the construction illustrated in Patent No. 2,492,635 the product enters the mixing chamber through a conduit which is coaxial with the shaft of the impeller blade. Steam enters the mixing chamber through small apertures in a plate disposed normal to the axis of the impeller. The edges of the impeller blade pass closely adjacent the surface of the plate and sweep the entering streams of steam and mix the steam particles intimately with the product being heated.

The construction of the agitating heater of the present invention improves the transfer of heat from the steam or other heating medium to the product being heated. This effect results from violent agitation of the product rather than the pressure of the impeller blades and effects a more intimate mixture of the heat medium and the product to be heated by dispersion of the product and the breaking up of any tendency for the product to move in a fixed path.

Another advantage of the instant invention is the improved sanitation which results from the arrangement of the inlet of product into the mixing chamber. The product does not come in contact with the threads of mating parts and thus there is no tendency of the product to lodge in the threads. Hence, cleaning of the equipment is facilitated.

Still another advantage of the invention is the concentration of the steam inlet apertures close to the inlet of the product. The greater portion of the steam thus comes in contact with cold product and is rapidly condensed. This eliminates a tendency of the steam to flash back through the product inlet line, which tendency is also further reduced by the shape of the impeller blades.

The steam is introduced into the mixing chamber through minute orifices in a circular plate. This plate is mounted on the open end of the casing of the mixing chamber with a gasket interposed. The location of the gasket and arrangement of parts is such that regardless of wear of the parts and particularly of the gasket the face of the orifice plate is located a fixed distance from the impeller blades. This avoids the necessity of excessive clearance and hence buildup of product on the face of the plate is avoided and the entry of large bubbles of steam into the product is eliminated.

Other objects of the present invention will become apparent upon reading the following specification and referring to the accompanying drawings in which similar characters of reference represent corresponding parts in each of the several views.

Figure 1:
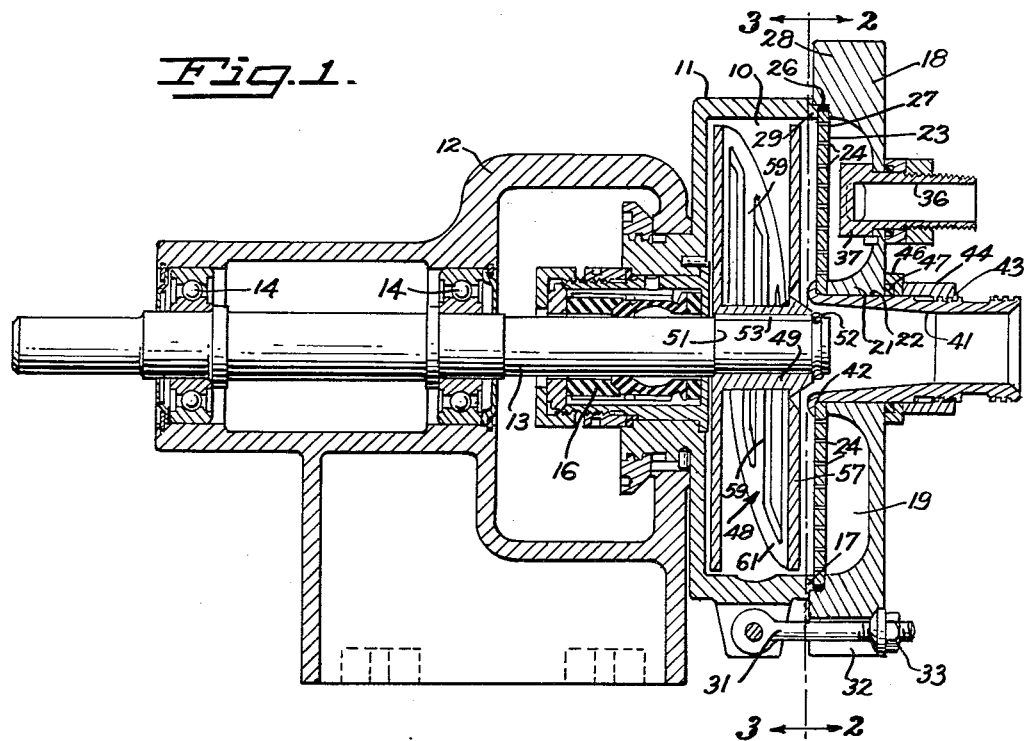
Fig. 1 is a longitudinal, vertical section of the agitating heater.

The mixing chamber 10 into which the product and heating medium are introduced is defined by a short, cylindrical casing 11 open at one end and having a horizontal axis. The casing is detachably mounted on a supporting base 12 in which is suitably journaled a shaft 13 which extends through an aperture in the end of casing opposite the open end thereof. The shaft is rotated by an electric motor (not shown) at a high rate of speed and is supported by suitable bearings 14. A suitable seal 16 is installed in the casing 11 adjacent the mixing chamber 10 to prevent leakage of coolant into the mixing chamber or leakage of product from the mixing chamber.

Beyond the open end 17 of the casing is an annularly recessed circular body 18 which provides a steam chest 19. The body 18 is formed with a central hub 21 provided with a circular aperture 22 at its center coaxial with shaft 13, and outside said hub is an annular groove which forms steam chest 19, the outer diameter of said groove being substantially the same as the inner diameter of the mixing chamber 10.

Interposed between the casing 11 and the body 18 is a thin, apertured, annular orifice plate 23, which separates the mixing chamber 10 from the steam chest 19.

Figure 2:
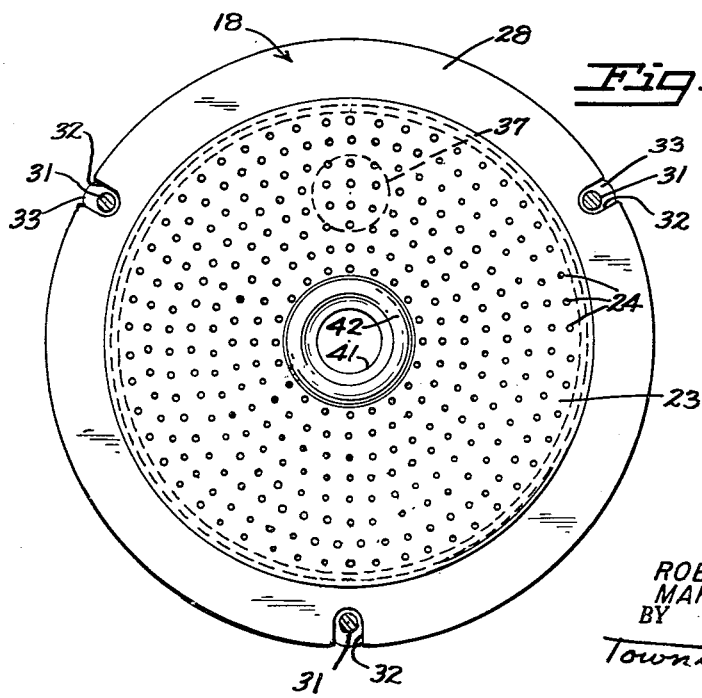
Fig. 2 is a transverse vertical section taken substantially along the line 2—2 of Fig. 1.
Figure 3:
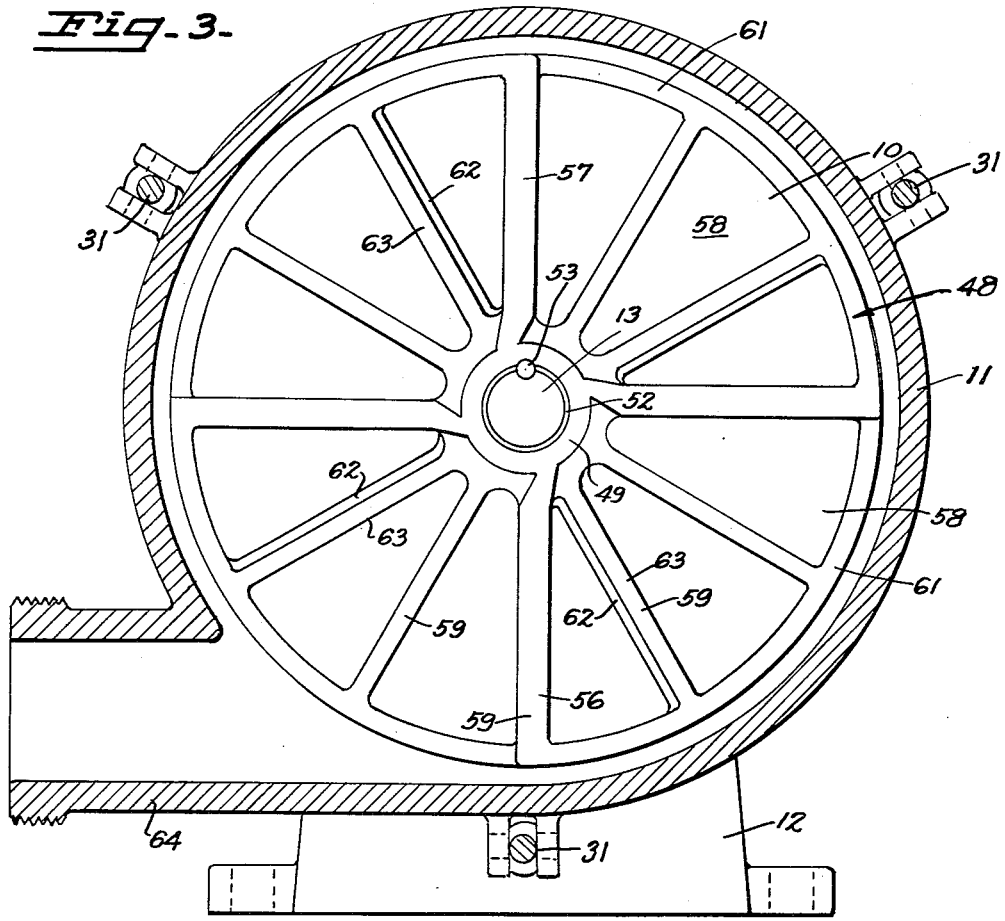
Fig. 3 is a transverse vertical section taken substantially along the line 3—3 of Fig. 1.
Figure 4:
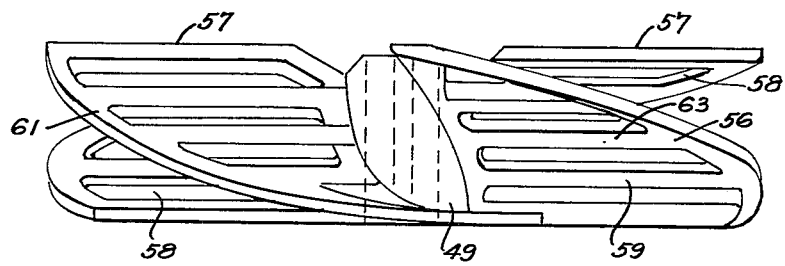
Fig. 4 is a top plan of the improved impeller constructed in accordance with this invention.

The pattern of the holes 24 in plate 23 is such that they are centered around the aperture 22, as shown particularly in Fig. 2. The holes are highly concentrated at the central axis of the mixing chamber 10 to insure intimate contact with the product while the latter is relatively cool. Around the edge of plate 23 is a sealing gasket 26, the plate 23 fitting inside a recess 27 in the inner edge of the peripheral flange 28 of body 18 into which a projecting, annular ridge 29 on the open end of casing 11 also fits. A plurality of hinged, clamping bolts 31 mounted on casing 11 project through slots 32 in the periphery of body 18 so that when the nuts 33 on the ends of said bolts 31 are tightened, the body 18 and casing 11 are drawn snugly together, the plate 23 being clamped in position therebetween. By reason of gasket 26 fitting around the periphery of plate 23, wear of gasket 26 does not affect the tightness of fit of body 18 against casing 11. Further, buildup of product around the juncture of the parts is prevented.

Steam enters the chest 19 in body 18 through fitting 36 connected to a suitable source of superheated steam under pressure, fitting 36 entering through an aperture in the back of body 18 and projecting into chest groove 19, there being a deflector 37 in the end of fitting 36 which insures that the steam will circulate substantially uniformly around groove 19. Steam passes into the mixing chamber 10 through the apertures 24 in plate 23.

The fluid product enters the mixing chamber 10 through a conduit 41 which is coaxial with the axis of shaft 13 and which extends through aperture 22 in hub 21 of body 18 and a circular aperture in the center of plate 23, the inner diameter of conduit 41 flares adjacent its terminus. The inner end of conduit 41 is formed with an outwardly flared and rounded lip 42 which overlaps the circumference of the aperture in plate 23. The exterior of conduit 41 is threaded as indicated by reference numeral 43 and said threads are engaged by a nut 44, the inner end of which abuts a ring 46 recessed for a sealing gasket 47. By tightening nut 44 conduit 41 is drawn to the right, as indicated in Fig. 1, thereby tightening lip 42 against plate 23. It will be seen that there are no threaded joints between conduit 41 and plate 23 with which the product comes in contact. Hence, there are no threads in which product may lodge, and cleaning is facilitated.

Impeller 48, the shape of which is hereinafter described in greater detail, is mounted on the end of shaft 13. The hub 49 of impeller 48 fits over the end of shaft 13 and lodges against shoulder 51 on shaft 13. A snap ring 52 engages a groove adjacent the end of shaft 13 and retains the impeller thereon. A key 53 is also provided to impart rotative movement of the shaft 13 to impeller 48.

The agitator impeller 48 is formed with a series of spiral blades 56 extending out from hub 49. As viewed in Fig. 1, the right hand edge 57 of each blade is parallel to plate 23, radially extending and sharp. As the impeller 48 revolves, edges 57 sweep across plate 23 a fixed distance therefrom, thereby sweeping away segments of steam entering the mixing chamber 10 through apertures 24 in plate 23. Each blade 56 is apertured in a plurality of windows 58 which form, in effect, a plurality of radial spokes 59, the outer ends of which are connected by an outer rim 61. The rectangular shape of the spokes 59 provides a thin leading edge having surfaces 62 and 63 in two planes which are substantially at right angles to one another and each of which is approximately at a 45° angle with respect to the direction of rotation of the impeller. This arrangement of the spokes 59 results in the product being deflected part toward the right and part toward the left, as viewed in Fig. 1, as the impeller revolves. Such a divergence in the direction of movement of the product produces a more violent agitation and consequently a more thorough mixing of the steam and product. The spokes 59 are formed as thin as the strength of the material of the impeller allows, and a narrow rim 61 is provided at the outer ends of the spokes in order to eliminate, insofar as possible, any pumping action which would tend to draw the product into the mixing chamber in the manner of the action of a pump. Thus, the function of the impeller blades 48 is to sweep the surface of the orifice plate 23 to break up the streams of steam into small segments which are more easily assimilated by the product and to deflect and agitate the product and steam segments so as to obtain an intimate mixture which causes condensation of the steam rapidly and without pulsation, thereby raising the temperature of the product substantially instantaneously. The product is discharged through a tangentially directed port 64 in the periphery of the mixing chamber casing 11.

It will be noted that the impeller 48 may be formed with any desired number of blades 56. Thus two or three blades 56 may be formed extending from the central hub 49 to the periphery of the mixing chamber 10. The number of blades 56 is dependent upon the capacity of the mixing chamber and the type of product being handled, it being desirable to control the amount of mechanical working given to the product being processed. Further and for the same purpose, the number of windows 58 formed in each blade may vary in order to vary the number of spokes 59 provided.

It will be noted that the holes 24 in the orifice plate 23 are concentrated near the entrance of the product, i. e. the lip 42, although it is necessary to have a sufficient volume of steam and thus some distribution of steam through apertures in the whole surface area of the orifice plate. It has been found desirable that the apertures 24 be concentrated near the lip 42 so that most of the steam is introduced where the product is at the lowest temperature, thereby resulting in more rapid condensation. If the steam were introduced adjacent the periphery of plate 23, it is possible that the product would be hot and improper condensation might cause a flashing back of the steam up the product intake line 41. Another advantage of the concentration of the apertures in the orifice plate adjacent the center thereof is that a longer agitating time for the steam and product results because of the increased distance between the point of contact of the steam and the outlet port 64. This results in an improved mixing action.

*Operation*

Upon assembly of the apparatus, the shaft 13 is rotated at a high rate of speed, such as 1750 R. P. M., thereby likewise rotating impeller 48. The product, which is in fluid state, is forced by a pump through inlet conduit 41. Steam, preferably with high super heat and low pressure, is introduced through inlet 36 and is disposed around groove 19, passing into the mixing chamber 10 through the apertures 24 in orifice plate 23. Rotation of the impeller 48 causes the edges 57 of blades 56 to sweep over the face of the orifice plate 23 and break up the streams of steam entering through apertures 24 into small and more readily assimilated particles. The product and steam are intimately mixed as the impeller 48 revolves, great dispersion being caused by reason of the direction of the planes 62 and 63 of the surface of rectangular spokes 59 which deflect both the product and the steam in diverse directions. The intimate mixture of the steam and product causes rapid condensation of the steam and the heat transferred to the product results in an almost instantaneous elevation of temperature without burning. At the same time, a certain amount of mechanical working of the product occurs by reason of contact with the impeller blades 56. After mixing, the product passes out of the mixing chamber through port 64.

When the operation is completed, the apparatus is conveniently disassembled for cleaning by loosening nuts 33 and removing body 18. The conduit 41 and plate 23 are removed from body 18 by loosening nut 44. The impeller 48 is removed from the shaft by loosening ring 52.

When it is desired to reassemble the apparatus the reverse operations are performed.

It will be noted, however, that the assembly of conduit 41 and plate 23 provides a positive location of the conduit 41 in the central axis of the mixing chamber 10 and that regardless of the wear of gasket 26 and regardless of the tension applied to tighten the casing 11 to the body 18, the leading edges 57 of the impeller blades 48 will remain in the same proximity of the orifice plate face. Hence, excessive clearance between the orifice plate 23 and the edges of the impeller blades 56 is eliminated. By reason of the fact that close proximity is facilitated, product build up on the face of the plate 23 or the entry into the mixing chamber of large bubbles of stem which results in a less efficient heating of the product are likewise eliminated.

It will also be seen that excess build up of material between the mixing chamber casing 11 and the orifice plate 23 is obviated since the plate 23 fits tightly against the face of the mixing chamber casing 11 and no threads are required in this area.

What is claimed is:

1. An agitating heater comprising a cylindrical casing open at one end, a circular plate closing off said open end, said plate being apertured in a plurality of small holes, a body behind said plate, said plate abutting said body, means for securing said casing, plate and body in position, said body being recessed to form a steam chest in back of said plate from which steam may pass into said casing through said holes, a shaft rotatably journaled in said casing and terminating proximate said plate, an agitator blade on said shaft proximate said plate, a heated fluid inlet to said chest, a product outlet from said casing, said plate being centrally apertured, a product inlet conduit passing through the aperture in the center of said plate, said conduit having a flange overlying the edge of the central aperture of said plate, said conduit being exteriorly threaded, and a nut in threaded engagement with the external threads of said conduit and arranged to bear against said body to tighten said flange against said plate to seal said conduit from direct communication with said chest or atmosphere.

2. An agitating heater according to claim 1 in which said body is formed with a peripheral groove in which the peripheral edge of said plate is received and there is a gasket around the outer edge of said plate and within said groove and in which said casing is formed with a ridge which is received in said groove and which bears against the peripheral edge of said plate, and in which is further provided fastening means to tighten said ridge against said plate to form tight seals between said casing and plate and said body and plate.

3. An impeller for an agitating heater comprising a central hub and at least one spiral blade extending outwardly from said hub, said blade being formed with a sharp radially extending edge at one end, said blade further being formed with a plurality of windows in its spiral surface with a connecting peripheral rim.

4. An impeller according to claim 3 in which windows are shaped to form radially extending spokes substantially rectangular in cross-section with their leading surfaces lying in two planes substantially 90° apart and each at an angle of 45° to the direction of rotation of said impeller.

5. An impeller according to claim 3 in which is provided a plurality of identically formed blades extending symmetrically from said hub.

References Cited in the file of this patent

UNITED STATES PATENTS

| | | |
|---|---|---|
| 599,392 | Kilby et al. | Feb. 22, 1898 |
| 1,794,214 | Thurm et al. | Feb. 24, 1931 |
| 2,377,069 | Brubaker | May 29, 1945 |
| 2,492,635 | Hawk | Dec. 27, 1949 |
| 2,633,170 | Balmain | Mar. 31, 1953 |